Dec. 13, 1966
P. MAMIE
3,290,767
ASSEMBLY APPARATUS
Filed Feb. 11, 1966
2 Sheets-Sheet 1
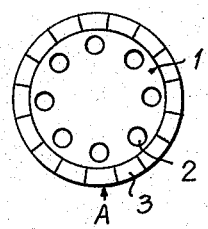
FIG. 1
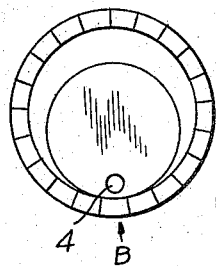
FIG. 2
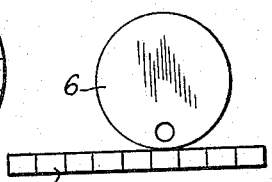
FIG. 3
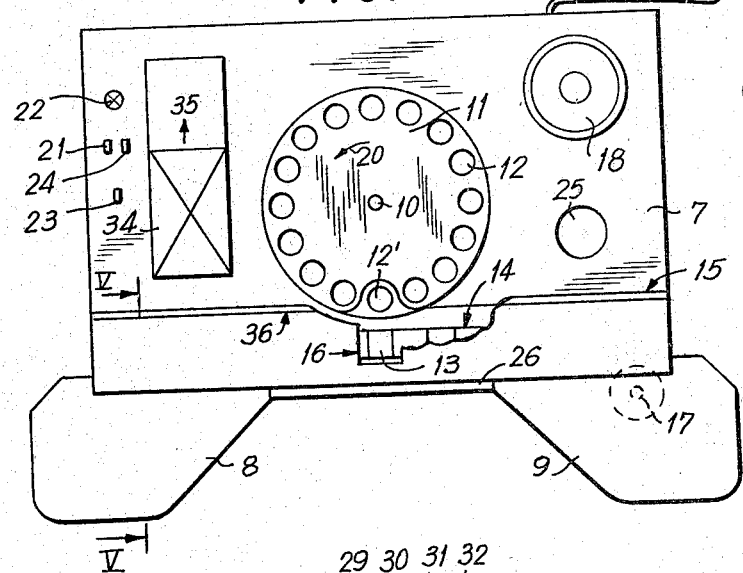
FIG. 4
FIG. 6
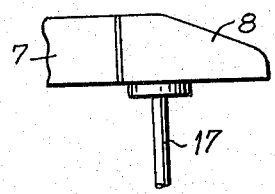
FIG. 5
FIG. 7

Dec. 13, 1966  P. MAMIE  3,290,767
ASSEMBLY APPARATUS
Filed Feb. 11, 1966  2 Sheets-Sheet 2
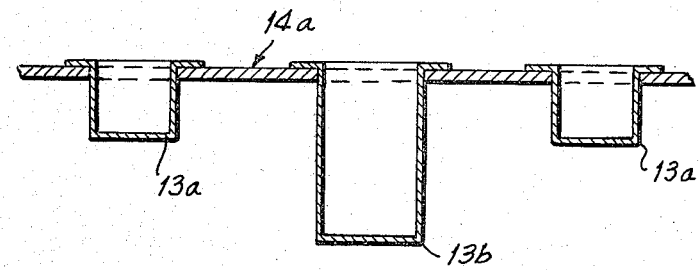
FIG. 8
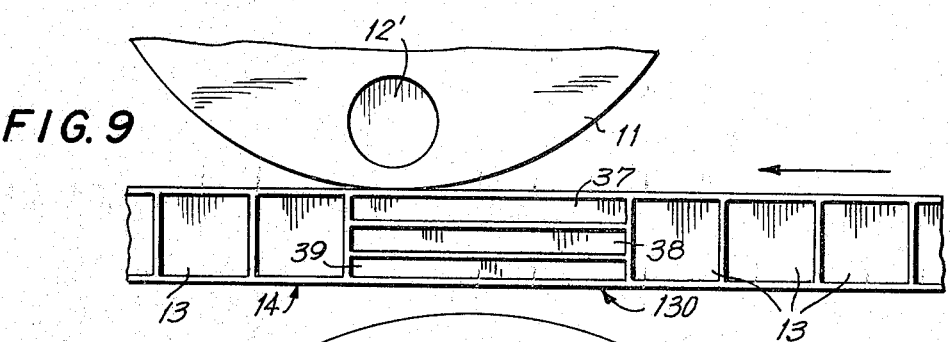
FIG. 9
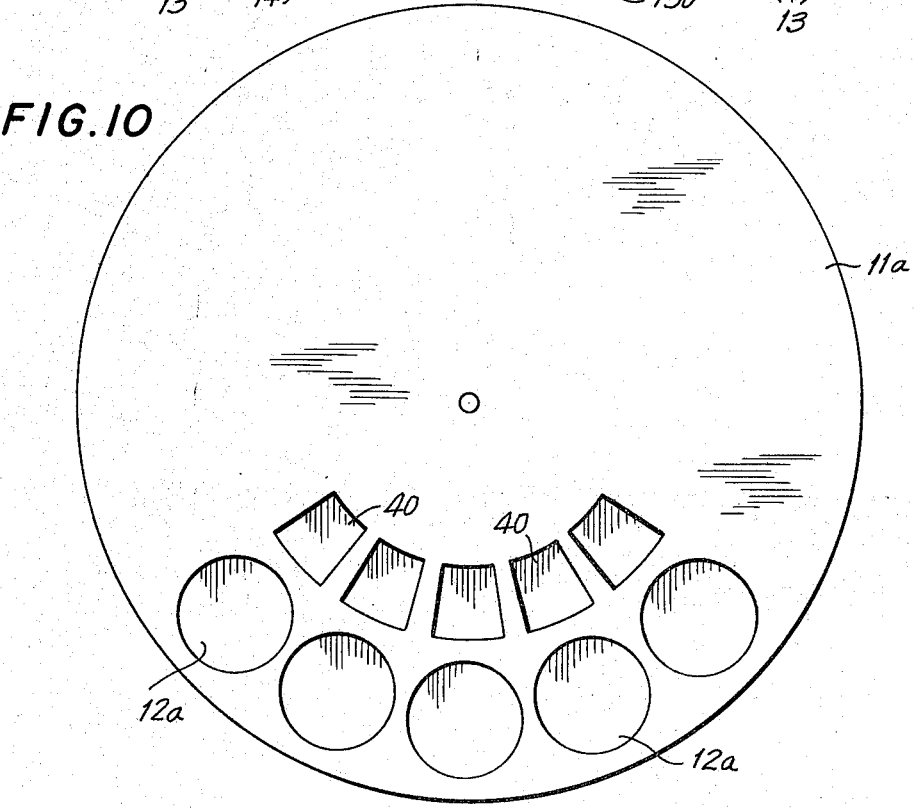
FIG. 10
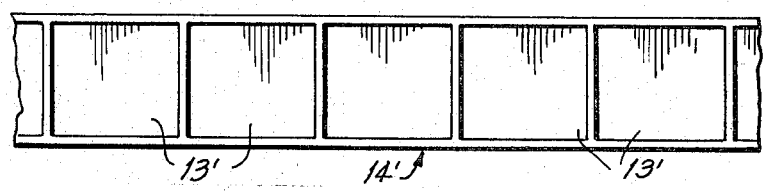

3,290,767
ASSEMBLY APPARATUS
Philippe Mamie, Le Sentier, Switzerland, assignor to Societe Anonyme de la Fabrique d'Horlogerie le Coultre et Cie, Le Sentier, Switzerland
Filed Feb. 11, 1966, Ser. No. 526,775
Claims priority, application Switzerland, June 30, 1965, 9,250/65, 9,251/65, 9,252/65
7 Claims. (Cl. 29—208)

This invention relates to the assembly of units, and more particularly to the assembly of small units such as in the fields of electronics and horology.

More particularly, in the fields of electronics and horology, it is necessary to mount, piece by piece, on members such as frames or plates small elements which are installed in a given order and possibly with intermediate operations such as, lubrication, measuring, controlling, and the like.

It is known to arrange the pieces to be assembled in this manner on conveying members, for example, linear or rotary members, such as conveying bands or discs, and to move them stepwise, in front of an operator at an assembly station. It is also known to dispose receptacles, such as, fixed or replaceable cups on the conveying members to contain the elements to be assembled during their mounting on the frames or plates.

Such an arrangement, however, does not prevent errors in assembly such as omission of an element and reversals in the assembly sequence. This is of great importance in horological and electronic assemblies where the assembly order is of great importance.

It is an object of the present invention to provide a device for assembling small units which is so conceived as to avoid such errors.

In a particular known arrangement there are provided two conveyor members one of which is adapted to receive and convey, step by step, the assembled units, while the other one is adapted to convey, step by step, successive supplies of the different members to be mounted on the units, said two conveyor members being movable along respective paths which pass adjacent each other at an assembly station.

The above-mentioned arrangement may be operated, for example, by a hand activated or knee activated control causing step by step advance of the conveyor of said units so as to bring each of said units successively into immediate promixity of a supply of members to be mounted thereon.

The conveyor with the supply of members thereon is moved stepwise after one complete cycle of movement of the conveyor with said units. Each container in the conveyor with said supply of members contains a separate supply of such members. This arrangement is satisfactory where each unit is assembled with successive members from the conveyor thereof.

However, it sometimes becomes necessary in the assembly of the members onto the units to utilize the same member more than once. This requires the repetitive supply of such members in subsequent cups which makes the conveyor thereof of greater length. Moreover, the arrangement of such members in different cups requires greater care and expenditure of time in filling such cups.

Another object of the invention to provide an improvement in an arrangement of the above type by which each supply of members is included in only one cup on the conveyor thereof, such conveyor being advanceable not only stepwise but being movable backwards as well so as to position a previously utilized cup once again at the assembly station for subsequent utilization of the members therein.

In the known arrangement it sometimes becomes necessary to assemble a plurality of elements on a unit one immediately after another. Another object of the invention is to permit such an operation, by providing a supply of each of such plurality of elements at a common location on its conveyor so that such plurality of elements is positioned in common at the assembly station for successive assembly on a unit.

Another problem associated with the known arrangement occurs when the members to be assembled on the units cannot be grouped together in a cup at a common supply location either due to the size of such members on their delicate construction. In order to overcome this difficulty, the present invention contemplates an improvement whereby members of the above type are supported one-by-one on the conveyor with the units on which they are to be assembled and adjacent respective of such units.

Further objects and features of the invention will become apparent from the following non-restrictive embodiments given by way of example in the attached drawings, wherein:

FIGURES 1–3 are diagrammatic views of three different arrangements according to the prior art;

FIGURE 4 is a plan view of a further arrangement according to the prior art;

FIGURE 5 is a sectional view taken along line V—V in FIG. 4;

FIGURE 6 is an elevation view of a portion of FIG. 5;

FIGURE 7 is a view of a punch card adapted for use in the arrangement of FIG. 4; and FIGURES 8–10 are views of modified portions of the arrangement in FIG. 4.

With reference to the drawing, it is deemed necessary to refer to the prior art as exemplified by FIGS. 1–7 in order to five a full understanding of the present invention.

Referring now to FIG. 1, there is shown a plan view of a disc conveyor 1 having eight cavities or pockets 2 distributed along its circumference. Said cavities are designed to contain and hold the frames or plates on which will be assembled elements to form an assembly. Such frames or plates may be, for example, frames of small electronic apparatus or plates of watch movements. Assuming that an assembly station is located at A in front of a workman, it will be seen that a step-by-step rotation of the conveyor disc 1 permits movement of the cavities 2 with the plates therein successively in front of such workman.

Arranged co-axially with said disc 1 and rotating about the latter is a second conveyor member formed of a continuous array of sixteen receptacles or cups 3, each of which is capable of containing a plurality of the same members to be mounted on each of the plates in the cavities 2, the members in each cup generally being different than the members in the other cups as will be explained more fully hereinafter. The members may be, for example, transistors, resistors, capacitors, connections, in the case of electronic equipment and springs, wheels, levers, bridges, screws, and the like in the case of horological equipment.

It is obvious that, by mounting on each piece in disc 1 located successively, at station A a member of a given type from the cup 3 located in immediate proximity thereto, also at station A, any mistake or omission by the operator will be avoided. Moreover, the work will be speeded up owing to the small distance between the members in 3 to be mounted on the pieces in 2 thereby reducing to a large extent the manual motion to be carried out by the workman, and the actual time needed for each operation.

Furthermore, by interengaging the drive of the two conveying members such that the array of cups 3 can only advance one step, i.e., one cup, once for a complete turn of the disc 1, the work will be carried out even more systematically and quickly. Thus, for example, if a small spring is to be mounted in position, followed by the installation of a screw, the workman will first have positioned in front of him a supply of springs in a cup 3. The disc 1 will rotate stepwise and a spring will be mounted on each plate in the cavities 2 of the disc 1. The conveying member with the array of cups 3 will then advance one step until the supply of screws is at station A, after which, the screws will then be mounted on the pieces in cups 2 one at a time. The operation will then be repeated for the next cup 3 and so on. In all instances, the workman will have in front of him at station A, the elements to be assembled and thereby the chance of error is virtually eliminated.

It is to be understood that for a given mounting unit, each cavity 2 will normally be filled. However, each cup 3 need not necessarily contain a supply of members. In fact, referring to the example shown in FIG. 1 of the drawing, there may be cases where the number of different members to be mounted will be less than the sixteen cups 3 which are shown therein. In this case, some of the cups will remain empty, and the useful length of the array of cups will be less than the total number of said cups.

An appropriate mechanism may establish a connection between the two conveyors and may provide a semi-automatic or fully automatic operation for the stepwise advance of conveyor 3, it being understood, however, that the advance of disc 1 with the cavities 2 will always be controlled by the workman.

As regards the disc 1 with the cavities 2 there has been indicated the necessity for the disc to make one complete turn for each advance by one step of the array of cups 3. However, provision may be made so that, after a number of turns has been achieved which corresponds to the number of members to be mounted, i.e., of cups 3 containing such members, the disc 1 is stopped to permit its replacement with a new disc containing a new series of pieces for assembly. Such replacement may be utilized to cause the array of cups 3 to be returned automatically to its starting position in which the first cup 3 containing a supply of the first members to be mounted, is located at station A. It is even possible to provide that the return of cup array 3 to its original position takes place automatically, by the shortest path, either in a clockwise or counterclockwise direction, depending on the normal direction of conveying and the number of cups filled. A mechanism of this kind is known per se in returning sweep secondhands to zero.

The conveyor 3 may also be interchangeable. This makes it possible to pass from one operation to the next by replacement of conveyors 1 and 3. Thereby, the overall completed assembly may be achieved in a number of sub-assembly operations.

In an assembly operation using the device according to the invention, it may also be necessary to carry out intermediate operations between the assembly steps. For example, in electronics, it may be necessary, after assembly of a member from cup 3 on the unit in cavities 2 to measure and check a resistance or an insulation before proceeding in the assembly of the next member; in watchmaking, it may be necessary to lubricate the assembled unit, or to control the freedom of motion of a runner or the like.

The workman should preferably be reminded of such an intermediate operation at the proper time. This can be done without changing the normal cycle of the above-cited operations by placing an instruction card or the like in a cup 3 instead of members to be assembled, to thereby remind the operator to carry out the required operation when the cup with said card comes into position in front of him at station A. In a refinement, the cups 3 may have detachable or semi-transparent bottoms making it possible to support at the bottom of the cups a device which can be illuminated from below by a light station A when it passes station A. It is also possible to employ an automatic stop for the conveyor 3 accompanied by audible or visual signals reminding the operator to carry out the intermediate operation before proceeding to the next cup of the conveyor 3.

The step-by-step advance of the two conveyors may be effected by a hand or knee operation or automatically. It is also possible to change from one of these modes of operation to the other and, in particular, for reverse motion of the conveyors in case of error.

Further modifications will be discussed as follows.

The conveying disc 1 and the ring-shaped cup arrangement 3 need not be coaxial as shown in FIG. 1. The arrangement of FIG. 2 shows an eccentric relation between the conveyors, the essential feature being the proximity of the paths of the elements carried by said two conveyors at station B. A single pocket 4 is shown in FIG. 2 on the inner disc to simplify the drawing.

It is understood that the conveyor with the cups may have any array of cups whatsoever, either closed or open. FIG. 3 shows a particular case of an open array in which a conveyor or distributor with cups 5, in linear array, moves along a path tangent to the disc 6, so as to provide a zone of immediate proximity between a cup containing members to be assembled and a cavity containing a piece on which said members are to be assembled.

The mounting unit according to the embodiment of FIGS. 4 and 5 consists of a flat rectangular box 7 whose front edge, in front of which the workman is seated, has, on the right and left sides, two arm rests 8 and 9 arranged symmetrically with respect to the small axis of the rectangle.

Located practically in the center of the box is a vertical shaft 10 which supports a conveying disc 11 having on its circumference sixteen pockets 12 dimensioned and profiled in such a manner that each is able to receive a piece to be assembled, either directly or with an intermediate support member interposed in said pockets.

In front of said disc, substantially tangent to the latter and parallel to the long front side of the rectangular box, is a distributor 14 with a linear arrangement of cups 13. The distributor moves longitudinally in a manner similar to that as already described with respect to FIG. 3. Said array of cups is actually contained in a box and hidden by a cover 15 (shown partially broken away) which is secured to the box 7 preferably in detachable manner. Cover 15 is provided with a cut-out 16 which exposes only the cup which is momentarily "in service," i.e., the cup containing the materials directly opposite the pocket 12' which is at the zone of tangency, viz. the assembly station.

Located at 17, below the unit, is a rod actuated by the knee of the operator, and at 18 is an electric motor which is connected to a power supply by cord 19. Other members shown in the drawing will be described later.

After having placed in position, disc 11, equipped with the pieces to be assembled and after having brought said disc to a predetermined angular position corresponding, for example, to a mark or an index of some kind, the workman will make sure that the linear distributor 14 is in its starting position, for example, as far to the right as possible in the drawing. For this purpose, there may be provided, for example, a lever or a push button. The first cup of the distributor filled with members of a given type is then located opposite a filled pocket 12. The workman, with his elbows on the arm rests, takes one member from said first cup 13 and assembles it in position on the piece in pocket 12. Then with the push of his knee the operator then causes the disc 11 to advance by one step, for example, in the direction of rotation indicated by the arrow 20. The operator then takes a second member from the same cup 13 and assembles it in position on the piece in the pocket now in front of him. The operator continues this procedure until the pieces contained in the sixteen pockets 12 all have a member from the first cup 13 assembled thereon.

After the disc 11 has executed a complete turn, the next members to be mounted onto the pieces in the pockets in disc 11 are contained in the second cup of the distributor 14.

The distributor 14 may then be manually advanced, by the workman. For this purpose a signal may be produced at the completion of rotation of the disc 11 to advise the workman to advance the distributors. Also a momentary stoppage of the disc may be employed to remind the workman to advance the distributor. Finally, the advancement of the distributor may be effected automatically in well known manner.

At the end of the mounting operation, it becomes necessary to replace the assembled pieces in disc 11 with new pieces to be assembled. This can be done by extracting the former, one by one from the pockets 12 and replacing them with the new pieces. An extractor may even be provided for this purpose.

But it is also possible to remove the disc 11 and replace the same with another filled with the new pieces; means may even be provided for blocking all operations until said replacement has been effected, and only thereafter will it be possible to return the linear distributor 14 to its starting position and to start the operation all over again.

Some control members which may usefully be provided are seen on the left of the unit in FIG. 4 of the drawing. These members are a general power switch 21 with an indicator lamp 22, a reversing switch 23 for reversing the direction of motion of the cup distributor 14, and a commutator switch 24 making it possible to switch from manual or semiautomatic control to fully automatic control, when these two possibilities exist.

On the right side, at 25, is a large cup designed to receive defective materials.

In front of the box, at 26, is a control board, a front view of which is illustrated in FIG. 6 and which may be provided with the following control members or indicators:

A button 27 which enables reversal of the direction of rotation of the disc 11 to carry out an additional control, for example, to rectify a mistake. A button 28 for the manually controlled step by step advance of the distributor 14 in the operating direction of feed. A signal lamp 29 for advising the workman of the necessity of supplying, or filling an empty disc, or of putting a filled disc in position at the start of a mounting cycle. Two signal lamps 30 and 31 for indicating the need of carrying out either one of two given intermediate operations prior to a subsequent assembly operation. A signal lamp 32 for indicating the need of removing the assembled pieces (either one by one or by removing the disc 11 at the end of a mounting cycle). A button 33 for the step by step return of the distributor 14, to its starting position.

All that has just been described can equally well take place automatically, for example, by means of a punch card establishing a programmed sequence of operations. Such card may be placed at 34 (FIG. 4) and may advance in the direction of the arrow 35, under or opposite contacts (not shown in the drawing). In this respect, such contacts and the diagrams corresponding to the modes and conditions of operation and the mechanical connections, have merely been described and are not shown in the drawing because they do not form part of the subject matter of the invention and can readily be supplied by anyone skilled in the art.

FIG. 7 shows a portion of such a card for use in the assembly of a given mechanism.

In the first column is a perforation or mark, which corresponds, governed by the line on which it is located, to the feed and which causes the lighting of the lamp 29, indicating that the disc 11 must be refilled or replaced with a disc filled with pieces to be assembled.

When the filling or replacing is terminated, a push with the knee, for example, against lever 17 or by an automatic release moves the card to the second column where a distribution order is given, i.e., whereby a first cup 13 is put in position, said cup containing members to be assembled in position onto the pieces in pockets 12 in disc 11.

After a complete turn of the disc 11, i.e., once all the pieces transported by said disc have been assembled with a member from cup 13, the card again advances by one column and gives an instruction, in its third position, for a new distribution. Thereby, the distributor is caused to advance by one step to present the next cup at the assembly station.

After a cycle similar to the preceding one, is terminated, the card reaches its fourth position in which it causes lighting of the lamp 30 indicating an intermediate operation, i.e., a lubrication operation in which a lubricant is to be applied to a given point of the assembled device. The same operation occurs in the fifth position of the card when the lamp indicates in the same manner that it is necessary to lubricate another point.

Either the workman is able to remember the order of these two lubricating operations which he then carries out when the distributor is not moving, or else, the distributor may remind the workman thereof by advancing each time and exposing a written instruction. In the sixth position, a new distribution takes place and continues to take place, successively, until the ninth position is reached. Different cups filled with different members will be successively conveyed to the assembly station.

After the successive mounting of said members (corresponding to four turns of the disc 11 and to an advance of four steps of the distributor) the tenth column comes into operation indicating again a lubrication by lighting of the lamp 30 and possibly causing the appearance of instructions in the distributor.

The eleventh column corresponds to an intermediate control operation (for example, the control of the freedom of motion of a piece) and the corresponding lamp 31 lights up with or without being accompanied by corresponding instructions in the distribution.

In the twelfth position, the discharge lamp 32 lights up which indicates the end of the mounting and the necessity of discharging the assembled pieces or removing the disc 11.

The card shown in the drawing has at its base two lines which are not used in the present example, but which may be used to control other operations.

FIGURE 4 shows a line 36 which represents the front edge of a transparent cover placed over the box 7, in particular, above the disc 11 which it protects against dust, having a notch opposite the cut-out 16 where the mounting is effected. In order rigorously to avoid any infiltration of dust, it is possible to blow in filtered, even conditioned, air under pressure under said cover.

The cover is preferably made of plastic material, as is the disc and, preferably the other elements of the unit described above.

It is to be noted that there may be provided only a sequence of operations consisting exclusively of measuring, controlling and lubricating, without supplying materials for assembly. In this case, the distributor 14 may convey instructions only, or may be replaced with a tape or film, which advances step by step so as to cause said instructions to pass in front of the workman.

The pockets of the disc may have a bottom or may extend completely through the disc, thereby making it possible to insert, above or below, mechanical mounting devices controlled, for example, by instructions inscribed on the free lines of the card shown in FIG. 7 and thereby reducing the proportion of manual operations.

The above-described mounting unit has the great advantage, as stated above, of making it possible to pass from one manufacture to another in record time. By holding in reverse sets of discs and filled distributors as a function of a given manufacture, it is easy, considering the possibilities of substituting said members, to introduce instantaneously into the machine a disc and a distributor, and possibly a punch card, corresponding to a given manufacture.

Finally, several units may be grouped, either side by side or face to face or according to any other arrangement so that, by transferring the filled discs from one unit to the other, a mounting sequence is formed, which can be arranged in accordance with requirements.

The example given above provides for a disc with 16 pockets. Normally, it will be advantageous to provide for twenty to twenty-five pockets.

It will also be useful to profile the pockets and even the discs so as to be able to stack them, when filled, one on top of the other, without running the risk of damaging the pieces to be assembled or already assembled, which they carry.

In the device disclosed above, the distributor has been shown to move in step-by-step sequence from the left to the right and instruction has been carried out sequentially. However, it sometimes is necessary to assemble members in one of the cups at two different stages of assembly. This requires the provision of the same members in different cups in the distributor.

The filling of such members in the cups of the distributor requires not only a great deal of time, but a longer distributor as well.

In a modification of the device disclosed above, all the same members are disposed in a single common cup and the distributor is displaceable in both directions according to predetermined instructions to reposition a cup at the assembly station after members from the cup have been employed in a previous assembly operation. Thus, the distributor is not restricted to move stepwise in one direction but is movable in opposite directions in a particular sequence so that cups for successive operations are positioned at the assembly station, irrespective of the order of arrangement of such cups along the distributor.

Thereby instead of the distributor moving step by step, it moves according to a predetermined instruction such that at least one reserve supply of a given material in one of said cups 13 appears at least twice in the assembly zone in which the two conveying members pass opposite each other.

This result can be obtained, for example, by providing a programmed drive of the distributor which is controlled by cams, punch cards or any other means suitable for obtaining said result.

In view of the fact that some members are used more than once in the assembly operation, they must be present in larger numbers than those which are used only once. It will be of advantage in such cases to provide distributors comprising pockets of different capacity but having, for example, the same size opening and different depths. Preferably, the distributor 14 can be provided with interchangeable pockets, making it possible to use pockets of different depths in correlation with the particular assembly program. In this regard in FIG. 8 the box of the distributor 14a is provided with a series of openings of common size, in which, cups of different depth 13a, 13b but of common cross-section may be inserted and retained by a flange on each cup.

In another requirement according to the invention each of the pieces in the pockets 12 may require the successive installation of two, three or more members of a similar sub-assembly prior to continuing the assembly operation according to a continued program. For example, in watchmaking, when mounting dial indicators, it may be necessary to put in position two or three runners and, then, a bridge to keep them in place.

When a distributor 14 is used which has cups of equal size which are successively advanced step by step, it will be necessary, with the passing of each pocket 12 containing the piece to be assembled, to cause two or three cups to pass in front of said piece, and then return them to their original positions. After all of the pieces in the pockets 12 have been assembled with the two or three members in the cups 13 operation is then resumed with the cup which contains the next members to be assembled, for example, the screws, which keep the previously assembled bridge in position.

Such an operation, however, affects the normal step by step feed advancement of the distributor 14.

The present invention offers a simple solution to the problem by providing in addition to the succession of cups of similar section in horizontal projection at least one pocket which is longer than the other pockets in the direction of advancement and which is divided widthwise, into at least two longitudinal compartments. In this respect, attention is directed to FIG. 9 in which the distributor 14 includes a cup 130 whose length in the direction of advancement is three times that of the other cups, said cup 130 being divided, widthwise, into three compartments 37, 38, 39.

Cups 37 and 38 will contain, for example, runners, and cup 39 will contain a bridge, while the next successive cup will contain the screws for fixing the bridges. The next successive cup will reach the assembly position when each of the pieces in the pockets 12 will have the members from the cups 37, 38, 39 assembled thereon.

The length of the cup 130 will preferably be a multiple of the length of the other cups in order not to have to make any changes in the step by step feed mechanism of the member transporting the materials.

It is to be understood that the number of cups and the length of the cup 130 divided in the above-described manner are given by way of non-restrictive example only.

According to yet a further aspect of the invention, certain members constituting premounted assemblies can not be put loosely, into the cups 13. In watchmaking, this is true, for example, in the case of the cock-balance-hairspring assembly, where each piece to be assembled must receive one unit, but where it is not possible to constitute a reserve supply by placing the numbers in a cup.

In order to solve this problem, the present invention provides that the conveyor 11, adapted to receive and to convey, step by step, the pieces to be assembled, comprises means adapted to receive and convey at least one sub-assembly unit for each of said pieces in the pockets 12.

In FIG. 10 the disc 11a has pockets or cavities 12a which pass one by one, in front of cups 13' of a linear distributor member 14'.

But in addition to said arrangement, the disc 11a is provided adjacent each pocket 12' with a second pocket 40 each adapted to receive a single premounted assembly. Said pockets 40 are disposed in a circle on the disc 11a concentric with the pockets 12a which are located adjacent the circumference of the disc.

As was noted above, the cups 13' of the distributor member may contain instead of members for assembly, operating instructions for an intermediate operation. Thereby there may be provided in one of the cups an instruction to the effect that the assemblies located in pockets 40 must be assembled in position one by one.

When the operator arrives at the cup 13' with the instruction to mount the sub-assemblies in the pockets 40 onto the pieces in the pockets 12a, the operator will then rotate the disc 11a stepwise and assemble each sub-assembly from the pockets 40 with the units in the pockets 12a. Thereby, the pre-mounted assemblies in pockets 40 are protected from any damage due to the fact that only one such assembly occupies each pocket.

It is understood that there may be more than one additional pocket 40 for each pocket 12a containing the piece to be assembled.

In general, the disc 11a will contain sets of additional pockets arranged in as many concentric circles as there are sub-assemblies to be mounted on the units in pockets 12a.

Numerous modifications and variations of the disclosed embodiments will become apparent to those skilled in the art without departing from the spirit and scope of the invention as defined by the attached claims.

What is claimed is:

1. In a device enabling the assembly of a number of units, a first conveyor having compartments each for containing an identical element of an assembly, said first conveyor being movable stepwise, a second conveyor having compartments adapted for containing members for being assembled with the elements in the compartments of the first conveyor, said second conveyor being movable along a path which passes in proximity with the first conveyor at an assembly station, whereat the members on the second conveyor are assembled with the elements of the first conveyor, each of the elements on the first conveyor being assembled with a member from the compartment of the second conveyor which is located at the assembly station after which the second conveyor is moved and another compartment thereof is located at the assembly station, an improvement wherein said second conveyor is movable in opposite directions to enable positioning each compartment more than once in front of the compartments of said first conveyor, said compartments in said second conveyor being constituted by cups, said second conveyor having openings for such cups all of a common size, the cups which are adapted for being positioned more than once in front of the compartments of said first conveyor having greater depth than the other of the cups.

2. A device as claimed in claim 1 wherein said cups are detachable and interchangeable in said second conveyor.

3. In a device enabling the assembly of a number of units, a first conveyor having compartments each for containing an identical element of an assembly, said first conveyor being movable stepwise, a second conveyor having compartments adapted for containing members for being assembled with the elements in the compartments of the first conveyor, said second conveyor being movable along a path which passes in proximity with the first conveyor at an assembly station, whereat the members on the second conveyor are assembled with the elements of the first conveyor, each of the elements on the first conveyor being assembled with a member from the compartment of the second conveyor which is located at the assembly station after which the second conveyor is moved and another compartment thereof is located at the assembly station, an improvement comprising a second set of compartments in the first conveyor one for each of the first compartments therein, said compartments of said second set being adapted for containing a single sub-assembly which is to be assembled with the element in the corresponding first compartment as each compartment passes the assembly station.

4. A device as claimed in claim 3 wherein said first and second sets of compartments are in circular concentric arrangement.

5. A device as claimed in claim 4 wherein the first set of compartments are peripherally mounted on the first member, the second set of compartments being within said first set.

6. In a device enabling the assembly of a number of units, a first conveyor having compartments each for containing an identical element of an assembly, said first conveyor being movable stepwise, a second conveyor having compartments adapted for containing members for being assembled with the elements in the compartments of the first conveyor, said second conveyor being movable along a path which passes in proximity with the first conveyor at an assembly station, whereat the members on the second conveyor are assembled with the elements of the first conveyor, each of the elements on the first conveyor being assembled with a member from the compartment of the second conveyor which is located at the assembly station after which the second conveyor is moved and another compartment thereof is located at the assembly station, an improvement wherein at least one of said compartments of said second conveyor has a length in the direction of its advancement which is a multiple of the length of the other compartments and said one compartment is divided widthwise to define at least two longitudinal sub-compartments.

7. A device enabling the assembly of a number of units comprising a first conveyor having compartments each for containing an identical element of an assembly, said first conveyor being movable stepwise, a second conveyor having compartments adapted for containing members for being assembled with the elements in the compartments of the first conveyor, said second conveyor being movable along a path which passes in proximity with the first conveyor at an assembly station, whereat the members on the second conveyor are assembled with the elements of the first conveyor, each of the elements on the first conveyor being assembled with a member from the compartment on the second conveyor which is located at the assembly station after which the second conveyor is moved and another compartment thereof is located at the assembly station, said second conveyor being movable in opposite directions to enable positioning each compartment more than once in front of the compartments of said first conveyor, said compartments in said second conveyor being constituted by cups, said second conveyor having openings for such cups all of a common size, the cups which are adapted for being positioned more than once in front of the compartments of said first conveyor having greater depth than the other of the cups, a second set of compartments in the first conveyor one for each of the first compartments therein, said compartments of said second set being adapted for containing a single sub-assembly which is to be assembled with the element in the corresponding first compartment as each compartment passes the assembly station, at least one of said compartments of said second conveyor having a length in the direction of its advancement which is a multiple of the length of the other compartments and said one compartment is divided widthwise to define at least two longitudinal sub-compartments.

No references cited.

SAMUEL F. COLEMAN, *Primary Examiner.*

M. L. AJEMAN, *Assistant Examiner.*